United States Patent [19]

Hucker

[11] Patent Number: 4,542,451
[45] Date of Patent: Sep. 17, 1985

[54] INVERTER WITH BIDIRECTIONAL INVERTER FOR REGENERATIVE CURRENT

[75] Inventor: David J. Hucker, Rockford, Ill.

[73] Assignee: Sundstrand Corporation, Rockford, Ill.

[21] Appl. No.: 539,936

[22] Filed: Oct. 7, 1983

[51] Int. Cl.[4] .......................................... H02M 7/537
[52] U.S. Cl. .................................... 363/132; 363/98; 323/222; 323/225
[58] Field of Search ............... 323/222, 223, 225, 232; 363/16, 17, 27, 41, 131, 132, 135, 136

[56] References Cited

U.S. PATENT DOCUMENTS 3,859,587  1/1975  Brown ................................. 363/135
3,864,619  2/1975  Tanako et al. ..................... 363/135
4,443,841  4/1984  Mikami et al. ..................... 363/132

Primary Examiner—William H. Beha, Jr.
Assistant Examiner—Jeffrey Sterrett
Attorney, Agent, or Firm—Wood, Dalton, Phillips, Mason & Rowe

[57] ABSTRACT

A bidirectional inverter circuit for evenly distributing energy among two capacitors in a DC power supply of a pulse width modulated inverter which provides an AC output to a load. The bidirectional inverter circuit is responsive to a greater charge on one of the power supply capacitors than on the other to divert regenerative current flowing to the power supply from the load away from the one capacitor and to transfer charge to the other capacitor.

13 Claims, 3 Drawing Figures

INVERTER WITH BIDIRECTIONAL INVERTER FOR REGENERATIVE CURRENT

TECHNICAL FIELD

The present invention relates to a system for distributing energy in an inverter having a DC power supply and more particularly to a bidirectional inverter circuit for use with a pulse width modulated inverter having a DC power supply with two capacitors, the circuit being responsive to a greater voltage across one capacitor than the other capacitor to direct regenerative current away from the one capacitor and to transfer charge to the other capacitor so as to evenly distribute the charge.

BACKGROUND OF THE INVENTION

A known pulse width modulated (PWM) inverter includes a center tapped power supply with positive and negative terminals, the center tap being connected to neutral or ground. The positive and negative terminals are connected to a low pass output filter through respective switches which may be transistors or the like. The inverter switches are controlled to alternately conduct current to the output filter, the switches providing a pulse width modulated waveform to the filter, which in response thereto, provides an AC output which is applied to a load.

One problem with such known PWM inverters is the ability of the DC power supply to cope with regenerative currents flowing from the load. Regenerative load currents may be quite large, a load on an aircraft, for example, typically having a power factor of 0.75 lagging to unity. In applications, such as on an aircraft, where the inverter load may be reactive, the power supply typically includes a pair of capacitors for accepting all of the regenerative load current, one capacitor being connected between the positive terminal and center tap of the power supply and the other capacitor being connected between the negative terminal and center tap of the power supply. One capacitor accepts all of the regenerative current flowing when one of the inverter switches is on, while the other capacitor accepts all of the regenerative current flowing when the other inverter switch is on. During the generation of each half-cycle of the AC output, one of the inverter switches is typically on a greater amount of time than the other switch resulting in an uneven distribution of charge on the power supply capacitors since one of the capacitors must accept more regenerative current than the other capacitor. Further, the power supply capacitors in such known PWM inverters typically cannot discharge while a regenerative current is flowing to the power supply so that each capacitor must store all of the regenerative current flowing thereto during the generation of each half-cycle. Since the regenerative current is not distributed evenly among the capacitors during the formation of each half-cycle of the AC output and because the capacitors cannot discharge while a regenerative current is flowing to the power supply, the power supply capacitors must be quite large.

DISCLOSURE OF THE INVENTION

In accordance with the present invention, the disadvantages of prior PWM inverters as discussed above have been overcome. The PWM inverter of the present invention includes a bidirectional inverter circuit which is responsive to a greater voltage on one of the power supply capacitors to direct regenerative current flowing to the power supply away from that one capacitor and to transfer charge to the other capacitor so as to evenly distribute charge among the power supply capacitors during each half-cycle of the AC output. The bidirectional inverter circuit also provides a path for the capacitors to discharge through while regenerative current is flowing to the power supply. The bidirectional inverter, by distributing charge evenly between the power supply capacitor during each half-cycle of the AC output and by providing a path for the capacitors to discharge through, enables the size of the capacitors to be reduced by approximately 50%.

The bidirectional inverter circuit is coupled across the DC power supply of the PWM inverter, the power supply having positive and negative terminals, a center tap or intermediate reference terminal connected to ground, a first capacitor connected between the positive terminal and the reference terminal and the second capacitor connected between the negative terminal and reference terminal. The bidirectional inverter circuit provides a first path for regenerative current between the positive power supply terminal and the reference terminal and a second path for regenerative current between the negative power supply terminal and the reference terminal. When the voltage across one of the power supply capacitors is greater than the voltage across the other power supply capacitor, the bidirectional inverter diverts regenerative current away from the one capacitor through one of the first or second paths to the reference terminal. Current flowing through one path of the bidirectional inverter induces a current flowing in the other path of the bidirectional inverter to transfer charge to the other capacitor.

The first path of the bidirectional inverter is formed by the parallel combination of a first switch and rectifier coupled between the positive power supply terminal and a first winding of an autotransformer having an intermediate tap connected to the reference terminal of the power supply. The second path of the bidirectional inverter is formed by the parallel combination of a second switch and rectifier coupled between the negative power supply terminal and a second winding of the autotransformer which is connected to the center tap of the power supply through the intermediate tap of the transformer. The first switch is responsive to a greater charge on the first capacitor than on the second capacitor to divert regenerative current away from the first capacitor through the first transformer winding, current flowing through the first transformer winding inducing a current to flow through the second transformer winding to transfer charge to the second capacitor through the second rectifier. Similarly, the second switch is responsive to a greater charge on the second capacitor than on the first capacitor to divert regenerative current away from the second capacitor through the second winding of the transformer, current flowing through the second transformer winding inducing a current to flow through the first transformer winding to charge the first capacitor through the first rectifier.

In order to provide a square wave of alternating voltage to the autotransformer of the bidirectional inverter circuit, a third and fourth switch and rectifier pair are provided. The third switch and parallel rectifier are connected between the first winding of the transformer and the negative terminal of the power supply and the fourth switch and parallel rectifier are connected between the second transformer winding and the positive power supply terminal. The third and fourth switches, when turned on, are also responsive to a greater charge on one of the capacitors to divert regenerative current away from the one capacitor and to transfer charge to the other capacitor. The first and second switches are turned on while the third and fourth switches are off to form one half-cycle of the square wave applied to the autotransformer. The third and fourth switches are turned on while the first and second switches are off to form the alternate half-cycle of the square wave applied to the autotransformer. The switches are controlled to provide a high frequency square wave of alternating voltage to the autotransformer so as to allow the size of the transformer to be minimized.

BEST MODE FOR CARRYING OUT THE INVENTION

Figure 1:
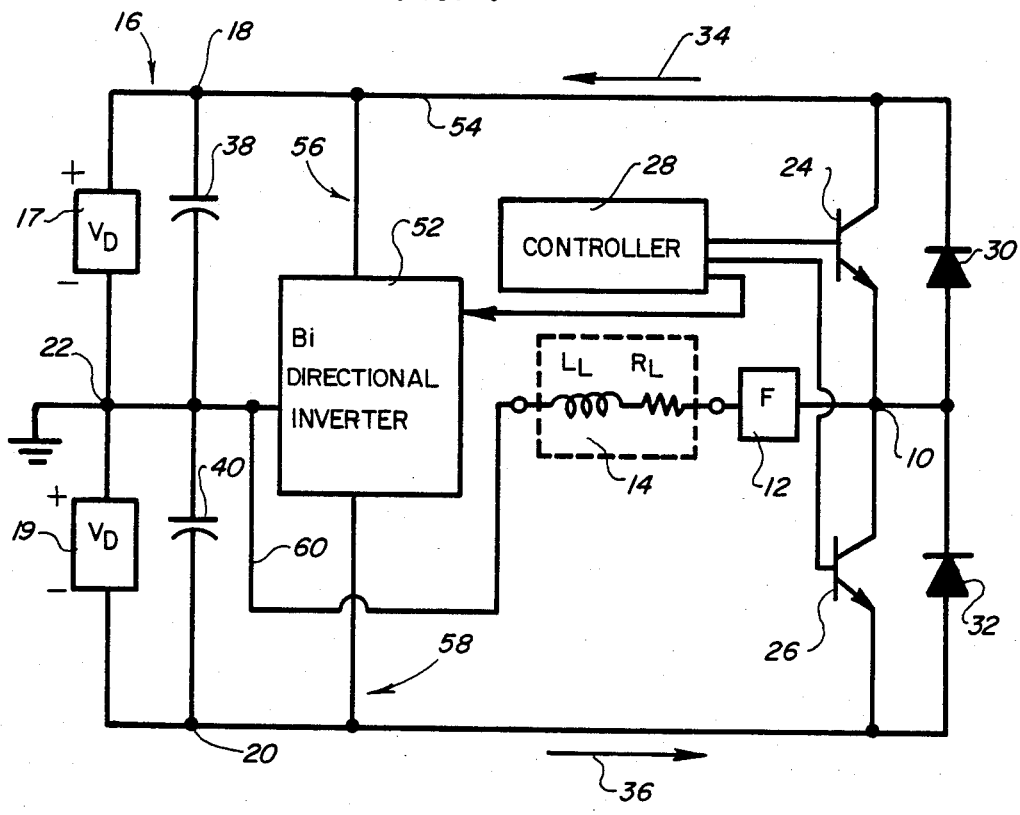
FIG. 1 is a schematic diagram of one phase of a pulse width modulated inverter employing the bidirectional inverter circuit of the present invention as shown in block form.

The inverter shown in FIG. 1 provides a pulse width modulated waveform at a junction 10 to a low pass filter 12, the filter having an AC output which is applied to a load 14. The inverter includes a center tapped power supply generally designated 16 having a DC source 17 connected to a terminal 18 for providing a positive DC voltage and having a DC source 19 connected to a terminal 20 to provide a negative DC voltage, the center tap 22 of the power supply being connected to neutral or ground. The output filter 12 and load 14 are coupled between the center tap 22 and the positive and negative power supply terminals 18 and 20 through a pair of series connected transistors 24 and 26 which are controlled by a controller 28 to provide the pulse width modulated waveform at the junction 10.

A pair of diodes 30 and 32 are connected in parallel across the respective transistors 24 and 26 to provide a path for regenerative current flowing in the respective directions of the arrows 34 and 36. The power supply 16 is provided with a pair of capacitors 38 and 40 for accepting regenerative current as discussed in detail below, the capacitor 38 being connected between the positive power supply terminal 18 and the center tap 22 and the capacitor 40 being connected between the negative power supply terminal 20 and the center tap 22.

Figure 2:
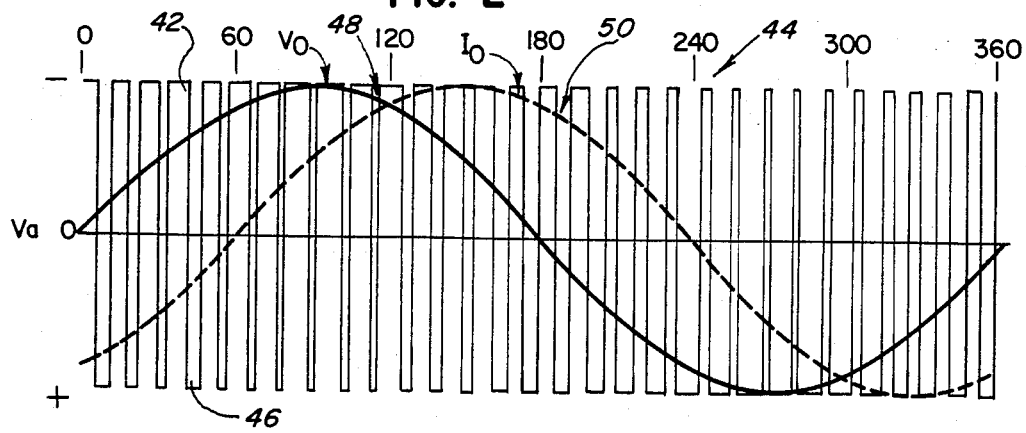
FIG. 2 is a graph illustrating a pulse width modulated waveform output from the PWM inverter of FIG. 1, the output voltage and a 60° lagging ouput current of the PWM inverter output filter.

The inverter transistor switch 24 is turned on by the controller 28 while the transistor 26 is turned off to provide positive going pulses such as the pulse 42 of the pulse width modulated waveform 44 illustrated in FIG. 2. Similarly the transistor 26 is turned on while the transistor 24 is off to provide negative going pulses such as the pulse 46 of the pulse width modulated waveform 44. The width of the positive pulses is greater than the width of the negative pulses during the 0° to 180° period and the width of the negative pulses is greater than the width of the positive pulses during the period 180° to 360° in order to provide a pulse width modulated waveform at junction 10 to which the filter 12 responds to provide the positive and negative half-cycles of a voltage output waveform 48 which is applied to the load 14. When the load 14 is reactive, the output current may lag the output voltage 48 as illustrated by the 60° lagging output current 50.

With the voltage and current waveforms 48 and 50 as illustrated in FIG. 2, regenerative current flows during the generation of the 0°-60° and the 180°-240° portions of the AC filter output. When the transistor 24 is turned on during the 0°-60° or 180°-240° portions of the output waveform, the regenerative current flows through the diode 30 to charge the capacitor 38. Similarly, when the transistor 26 is turned on during the 0°-60° or 180°-240° portions of the waveform, the regenerative current flows through the diode 32, charging the capacitor 40. From the pulse width modulated waveform 44, it is seen that during the generation of the positive half-cycle of the AC output, the capacitor 38 must accept a greater amount of regenerative current than the capacitor 40 resulting in a greater charge on the capacitor 38 than on the capacitor 40. During the generation of the negative half-cycle of the AC output the capacitor 40 must accept a greater amount of regenerative current than the capacitor 38 resulting in a greater charge on the capacitor 40 than on the capacitor 38. Further, the capacitors 38 and 40 must be sufficiently large to accept all of the regenerative current flowing thereto during the 0°-60° and 180°-240° portions of the waveform since neither capacitor can discharge while regenerative current is flowing to the power supply 16.

A bidirectional inverter 52 is provided for directing regenerative current flowing to one of the power supply capacitors having a greater charge thereon than the other capacitor, away from the one capacitor to transfer charge to the other capacitor so as to evenly distribute the charge among the capacitors during the generation of each half-cycle of the AC output. The bidirectional inverter 52 also provides a path for the capacitors to discharge through while regenerative current is flowing to the power supply.

The bidirectional inverter 52 is coupled across the DC power supply 16 to provide a first path generally designated 56 between the positive power supply terminal 18 and the center tap 22 and a second path generally designated 58 between the negative power supply terminal 20 and the center tap 22. When the voltage across one of the power supply capacitors 38 or 40 is greater than the voltage across the other power supply capacitor, the bidirectional inverter diverts regenerative current away from the one capacitor through either the first path 56 or the second path 58 to the center tap 22. Current flowing through either one of the paths 56 or 58 induces a current flowing in the other path to transfer charge to the capacitor having the lower voltage thereacross. More specifically, if the voltage across the capacitor 38 is greater than the voltage across the capacitor 40 and regenerative current is flowing along line 54, the bidirectional inverter 52 diverts the regenerative current on line 54 through the first path 56 to the center tap 22, inducing a current through the second path 58 to charge the capacitor 40. The bidirectional inverter also allows the capacitor 38 to discharge through the inverter circuit 52 along the first path 56 when the regenerative current on line 54 is diverted along the first path. If the voltage across the capacitor 40 is greater than the voltage across the capacitor 38 and regenerative current is flowing to the power supply from the load on line 60, the bidirectional inverter 52 diverts regenerative current on line 60 away from the capacitor 40 through the second path 58. Current flowing through the second path 58 induces a current flowing in the first path 56 to transfer charge to the capacitor 38. The bidirectional inverter also allows the capacitor 40 to discharge through the inverter circuit 52 along the second path 58 when the regenerative current on line 60 is diverted along the first path.

Figure 3:
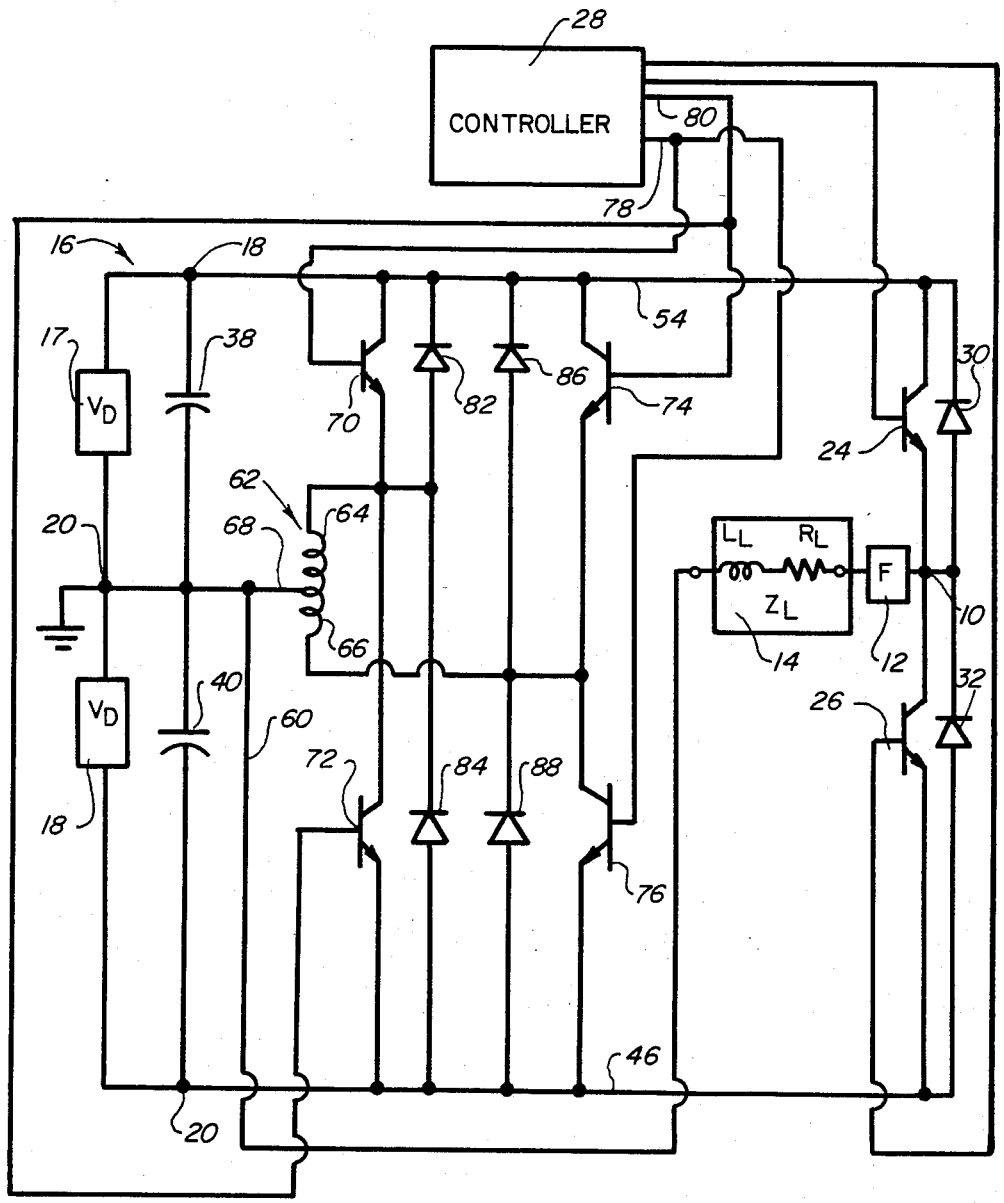
FIG. 3 is a schematic diagram of the pulse width modulated inverter and bidirectional inverter circuit of FIG. 1.

As shown in FIG. 3, the bidirectional inverter 52 includes an autotransformer 62 having a first winding 64, a second winding 66 and a center tap 68, the center tap 68 being connected to the reference terminal or center tap 22 of the power supply. The autotransformer is such that a current flowing in one direction through one of the first or second windings induces a current flowing in the opposite direction through the other transformer winding. The first winding 64 of the autotransformer is connected between the positive and negative terminals 18 and 20 of the power supply through respective transistors 70 and 72 whereas the second winding 66 of the autotransformer is connected between the positive and negative terminals 18 and 20 of the power supply through respective transistors 74 and 76. More specifically, the collector of the transistor 70 is connected to the positive power supply terminal 18 and the emitter of the transistor is connected to the first winding 64 of the transformer, the base of the transistor 70 being responsive to a signal applied thereto on line 78 from the controller 28 to turn the transistor on. The collector of the transistor 72 is also connected to the first winding 64 of the autotransformer 62, the emitter of the transistor being connected to the negative power supply terminal 20 and the base of the transistor 72 being responsive to a signal applied thereto on line 80 from the controller 28 to turn the transistor on. The collector of the transistor 74 is connected to the positive power supply terminal 18 and the emitter of the transistor is connected to the second transformer winding 66, the base of the transistor being responsive to a signal applied thereto on line 80 to turn the transistor on at the same time that the transistor 72 is on. The collector of the transistor 76 is connected to the second transformer winding 66 and the emitter of the transistor is connected to the negative power supply terminal 20, the base of the transistor being responsive to the signal applied on the line 78 from the controller 28 to turn the transistor on at the same time that the transistor 70 is turned on.

The bidirectional inverter circuit 52 also includes rectifiers or diodes 82, 84, 86 and 88, each of which is connected in parallel across a respective transistor 70, 72, 74 and 76. The diodes 82-88 along with the transistors 70-76 provide alternate first and second paths for regenerative current through the autotransformer 62 to transfer charge to one of the capacitors 38 or 40 when the other capacitors has a greater charge thereon as discussed in detail below.

The first and second paths 56 and 58 of the bidirectional inverter circuit 52 are formed either by the transistor-diode pairs 70, 82 and 76, 88, or by the transistor diode pairs 74, 86 and 72, 84 in conjunction with the first and second windings 64, 66 of the autotransformer 62, depending on which of the transistors are on. The transistors 70 and 76 are turned on by the controller 28 with the transistors 72 and 74 off, to form the positive half-cycle of a square wave of alternating voltage applied to the autotransformer 62. The transistors 72 and 74 are turned on with the transistors 70 and 76 turned off to form the negative half-cycle of the square wave. The transistor pairs 70, 76 and 72, 74 are controlled to switch at a high frequency to provide a high frequency square wave of alternating voltage across the autotransformer 62 so as to allow the size of the autotransformer to be minimized. It is noted that the switching transistors 70-76 of the bidirectional inverter circuits 52 are controlled independently of the transistors 24 and 26 of the PWM inverter.

The bidirectional inverter circuit 52 is responsive to a greater voltage on one of the capacitors 38 or 40 to direct regenerative current away from that one capacitor and to transfer charge to the other capacitor as follows. If a regenerative current is flowing while the PWM inverter transistor 24 is on, the regenerative current flows through the diode 30 charging the power supply capacitor 38. If the voltage across the capacitor 38 becomes greater than the voltage across the capacitor 40, indicating that the charge on the capacitor 38 is greater than the charge on the capacitor 40, the bidirectional switch diverts the regenerative current on line 54 away from the capacitor 38 to transfer charge to the capacitor 40. More specifically, if the voltage across the capacitor 38 is greater than the voltage across the capacitor 40 and the transistors 70 and 76 are on, the regenerative current on line 54 flows through the transistor 70 and the first transformer winding 64 back to the load 14 through the center tap 68 and line 60. The current flowing through the first transformer winding 64 induces a current of equal magnitude to flow through the second transformer winding 66 and diode 88 to transfer charge to the capacitor 40 so as to evenly distribute the charge among the capacitors. The transistor 70 not only provides a path to divert regenerative current away from the capacitor 38 when the charge on the capacitor 38 is greater than the charge on the capacitor 40 but also provides a path for the capacitor 38 to discharge through.

If the transistors 72 and 74 are on and the voltage across the capacitor 38 is greater than the voltage across the capacitor 40, the transistor 74 directs regenerative current flowing on line 54 to the power supply away from the capacitor 38 through the second transformer winding 66 and back to the load 14 on line 60. Current flowing through the second transformer winding 66 induces a current flowing through the first transformer winding 64 in the opposite direction such that the current flows through the diode 84 and the first transformer winding 64 to transfer charge to the capacitor 40.

If a regenerative current is flowing while the PWM inverter transistor 26 is on, the regenerative current flows through the diode 32 charging the capacitor 40. If the voltage across the capacitor 40 becomes greater than the voltage across the capacitor 38, indicating that the charge on the capacitor 40 is greater than the charge on the capacitor 38, the bidirectional inverter directs the regenerative current away from the capacitor 40 to transfer charge to the capacitor 38. If the voltage across the capacitor 40 is greater than the voltage across the capacitor 38 and the transistors 70 and 76 are on, regenerative current flowing on line 60 from the load is diverted away from the capacitor 40 through the second winding 66 of the autotransformer, through the transistor 76, back to the load through the diode 32. The regenerative current flowing through the second transformer winding 66 induces a current of equal magnitude flowing in the opposite direction through the first transformer winding 64, the current flowing through the diode 82 to transfer charge to the capacitor 38. The transistor 76 also provides a path for the capacitor 40 to discharge through during this time.

If the transistor 72 and the transistor 74 are on and the voltage across the capacitor 40 is greater than the voltage across the capacitor 38, the regenerative current flowing from the load on line 60 is diverted away from the capacitor 40 through the first transformer winding 64 and the transistor 72 back to the load through the diode 34. The current flowing through the first transformer winding induces a current flowing in the opposite direction through the second transformer winding 66 through the diode 86 to transfer charge to the capacitor 38.

Because the bidirectional inverter circuit 52 evenly distributes charge among the capacitors 38 and 40 during the generation of each half-cycle of the AC output applied to the load 14 and further provides a path for the capacitors to discharge through during the time that the regenerative current is flowing to the power supply, the size of the capacitors 38 and 40 may be reduced to 50% of the size normally required for power supply capacitors in prior PWM inverters.

I claim:

1. In an inverter for providing an AC output to a load, the inverter having a DC power supply with positive and negative terminals and an intermediate reference terminal connected to ground, a first capacitor connected between the positive terminal and ground and a second capacitor connected between the negative terminal and ground, means for directing regenerative current flowing to the power supply from the load away from one of said power supply capacitors to transfer charge to the other of said power supply capacitors comprising:

a bidirectional inverter coupled across said DC power supply for providing a first path for regenerative current between the positive terminal and the reference terminal of the power supply and a second path for regenerative current between the negative terminal and the reference terminal of the power supply, said bidirectional inverter being responsive to a greater charge on one of said capacitors than on the other of said capacitors to divert current away from said one capacitor through one of said first or second paths to said reference terminal, current flowing through said one path inducing a current flowing in the other of said paths to transfer charge to said other capacitor.

2. In an inverter for providing an AC output to a load, the inverter having a DC power supply with positive and negative terminals and an intermediate reference terminal, a first means connected between said positive terminal and said reference terminal for storing charge and a second means connected between said negative terminal and said reference terminal for storing charge, means for directing regenerative current flowing to the power supply from the load away from one of said first or second storage means to transfer charge to the other of said storage means comprising:

a transformer having a first winding, a second winding and a tap therebetween, said tap being connected to said power supply reference terminal;

first means for coupling the first transformer winding to the positive power supply terminal; and second means for coupling said second transformer winding to the negative power supply terminal;

said first and second coupling means being responsive to a greater charge on one of said storage means than on the other of said storage means for diverting regenerative current away from said one storage means through one of the first or second transformer windings, current flowing through said one transformer winding inducing a current to flow in the other transformer winding to transfer charge to said other storage means.

3. The inverter of claim 2 wherein said first coupling means is responsive to a greater charge on the first storage means than the second storge means to divert regenerative current away from said first storage means through the first transformer winding, current flowing through said first transformer winding inducing a current to flow through the second transformer winding to charge the second capacitor through said second coupling means; and said second coupling means is responsive to a greater charge on the second storage means than on said first storage means to divert regenerative current away from said second storage means through the second winding of the transformer, current flowing through said second transformer winding inducing a current to flow through the first transformer winding to charge the first capacitor through said first coupling means.

4. The inverter of claim 2 wherein each of said first and second coupling means includes a first and a second means for conducting current in one direction, said first and second means being connected in parallel and poled to conduct current in opposite directions.

5. In an inverter for providing an AC output to a load, the inverter having a DC power supply with positive and negative terminals and center tap, a first means connected between said positive terminal and said power supply center tap for storing charge and a second means connected between said negative terminal and said power supply center tap for storing charge, means for directing regenerative current flowing to the power supply from the load away from one of said storage means to transfer charge to the other of said storage means comprising:

a transformer having first and second windings and an intermediate tap connected to said power supply center tap;

first means for coupling the first transformer winding to said positive terminal and the second transformer winding to said negative terminal;

second means for coupling the first transformer winding to said negative terminal and the second transformer winding to said positive terminal;

means for controlling said first and second coupling means to alternately conduct current, each of said first and second coupling means, when controlled to conduct, being responsive to a greater charge on one of said storage means than on the other of said storage means to divert regenerative current away from said one storage means through one of said first or second transformer windings, current flowing through said one transformer winding inducing a current to flow through the other transformer winding to transfer charge to the other storage means.

6. The inverter of claim 5 wherein each of the first and second coupling means includes a switch connected between the positive and negative power supply terminals and the transformer, said control means alternately turning the switches of the first and second coupling means on to periodically reverse the connection of the transformer between the positive and negative terminals.

7. The inverter of claim 6 wherein the switches are controlled by said control means to apply a high frequency square wave of alternating voltage across the transformer to minimize the size of the transformer.

8. The inverter of claim 5 wherein said first coupling means includes:
  a first switch connected between the first transformer winding and the positive power supply terminal, said first switch being turned on by said control means to conduct current;
  a first rectifier connected in parallel with said first switch between said first transformer winding and the positive power supply terminal, said first switch, when turned on, and said first rectifier conducting current in opposite directions;
  a second switch connected between the second transformer winding and the negative power supply terminal, said second switch being turned on by said control means to conduct current;
  a second rectifier connected in parallel with said second switch between said second transformer winding and said negative power supply terminal, said second switch, when turned on, and said second rectifier conducting current in opposite directions.

9. The inverter of claim 8 wherein said first switch, when turned on, and said second rectifier provide a path for regenerative current to charge said second storage means when the charge on said first storage means is greater than the charge on said second storage means.

10. The inverter of claim 8 wherein said second switch, when turned on, and said first rectifier provide a path for regenerative current to charge said first storage means when the charge on the second storage means is greater than the charge on said first storage means.

11. The inverter of claim 8 wherein said second coupling means includes:
  a third switch connected between the first transformer winding and the negative power supply terminal, said third switch being turned on by said control means to conduct current;
  a third rectifier connected in parallel with said third switch between said first transformer winding and the negative power supply terminal, said third switch, when turned on, and said third rectifier conducting current in opposite direction;
  a fourth switch connected between the second transformer winding and the positive power supply terminal, said second switch being turned on by said control means to conduct current;
  a fourth rectifier connected in parallel with said fourth switch between said second transformer winding and the positive power supply terminal, said fourth switch, when turned on, and said fourth rectifier conducting current in opposite directions.

12. The inverter of claim 11 wherein said third switch, when turned on, and said fourth rectifier provide a path for regenerative current to charge said first storage means when the charge on said second storage means is greater than the charge on said first storage means.

13. The inverter of claim 11 wherein said fourth switch, when turned on, and said third rectifier provide a path for regenerative current to charge said second storage means when the charge on said first storage means is greater than the charge on said second storage means.

* * * * *